UNITED STATES PATENT OFFICE.

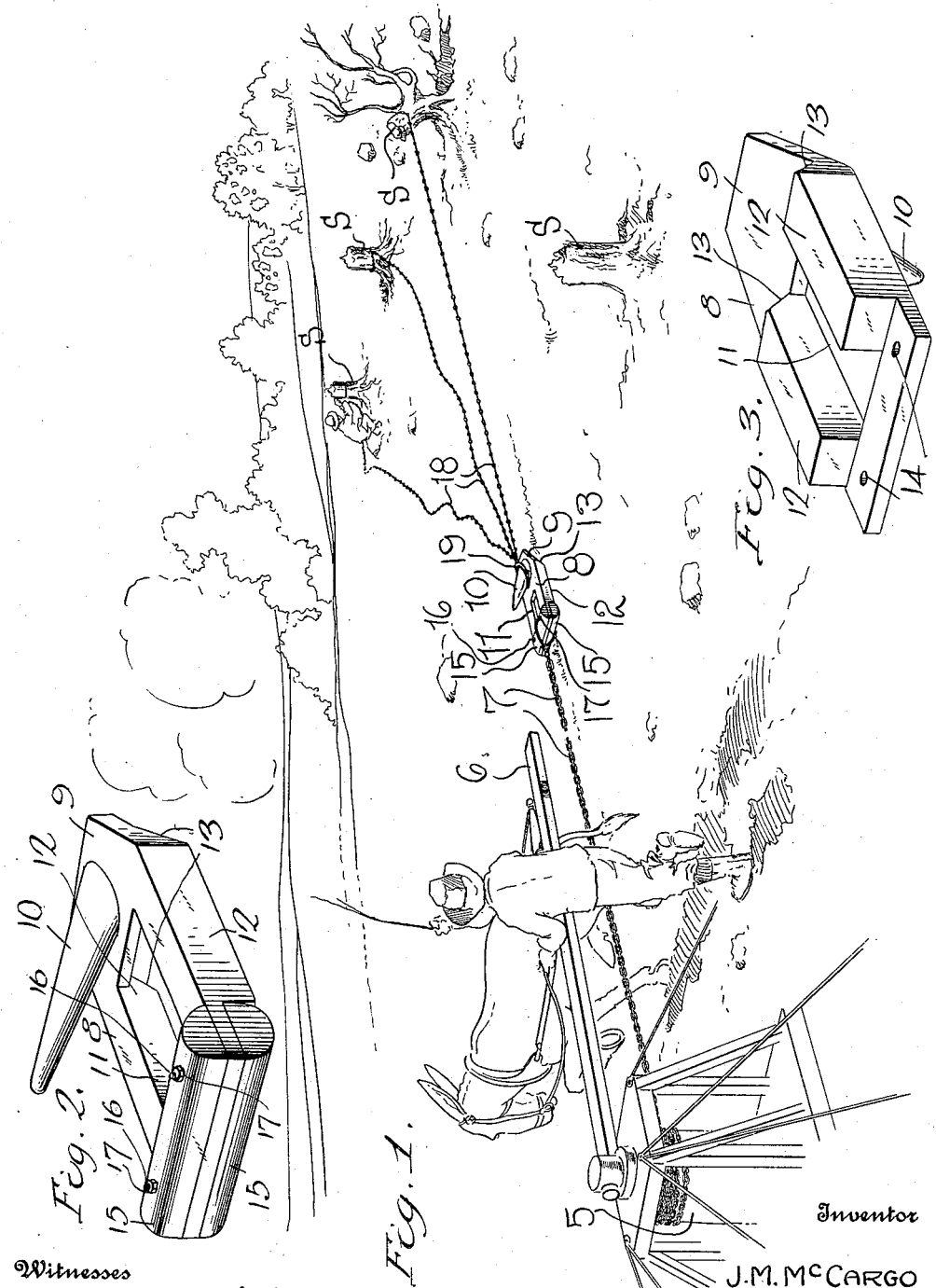

JAMES M. McCARGO, OF KEYSVILLE, VIRGINIA.

STUMP-PULLER.

1,169,846.  Specification of Letters Patent.  Patented Feb. 1, 1916.

Application filed March 10, 1915. Serial No. 13,437.

*To all whom it may concern:*

Be it known that I, JAMES M. McCARGO, a citizen of the United States, residing at Keysville, in the county of Charlotte and State of Virginia, have invented certain new and useful Improvements in Stump-Pullers, of which the following is a specification, reference being had to the accompanying drawings.

This invention relates to stump pullers, and has for its primary object to provide a device of the above character for expeditiously clearing a field of tree stumps.

The invention has for another and more specific object to provide improved means for connecting a plurality of tree stumps to the drum of the stump puller, whereby the stumps may be successively pulled or extracted from the ground, and after each stump is pulled, a connection made to another stump without interrupting the continued rotation of the drum.

The invention has for a further object to provide hitching or connecting means for stump pullers including a skid provided with an obliquely disposed horn at one end, to which a plurality of cables of relatively different lengths are adapted to be attached at one of their ends, the other ends of the respective cables being connected to individual tree stumps, and a pulling cable connected to the skid and to the drum of the stump puller.

With the above and other objects in view, my invention consists in the novel features of construction, combination, and arrangement of parts to be hereinafter more fully described, claimed, and illustrated in the accompanying drawings, in which, Figure 1 is a diagrammatic plan view showing the manner of using the present invention in clearing a field of tree stumps; Fig. 2 is an enlarged perspective view of the skid; Fig. 3 is an inverted perspective view of the skid, the reinforcing bars to which the cables are adapted to be attached, being removed.

Referring in detail to the drawings, and more particularly to Fig. 1 thereof, 5 designates the winding drum of a very common type of stump puller to which the sweep pole 6 is connected, the other end of said pole being provided with suitable draft attachments for the connection of the animals thereto. It will, however, be understood that the drum 5 may be power-operated.

To this drum, one end of the pulling cable 7 is suitably connected, the other end of said cable being adapted for attachment to a hitching skid which I will now describe in detail. The skid through the medium of which the connection is made between the stump cables and pulling cable 7, consists of a heavy cast metal body 8, one end thereof being longitudinally tapered, as at 9. Upon this tapering end of the body 8, the obliquely disposed conically shaped horn 10 is integrally formed and projects from upper face of the body plate. This body plate is centrally provided with a rectangular opening shown at 11, the purpose of which will be hereinafter explained. Upon the opposite face of the body plate with respect to the horn 10, and at each side of the opening 11, the longitudinally extending rectangular enlargements 12 are formed, which constitute the runners of the skid. At one of their ends, these runners are beveled or inclined, as shown at 13, and gradually merge into the tapering end 9 of the body plate. These longitudinally disposed runners also serve as reinforcements for the body plate 8. The opposite ends of the runners 12 terminate on a line coincident with one end of the opening 11 and in spaced relation to the corresponding end of the body plate. This end portion of the body plate which projects beyond the runners, is provided with spaced openings 14, and upon each side of the body plate, beyond the runners 12, the transversely disposed heavy wooden reinforcing bars 15 are arranged. These bars are also provided with openings adjacent their ends to coincide with the openings 14 in the body plate, and through said openings, the bolts 16 are inserted, nuts 17 being threaded upon the upper ends of said bolts whereby the reinforcing bars are securely clamped to the end of the body plate.

18 indicates a series of cables which, as shown in Fig. 1 of the drawings, are of relatively different lengths and are adapted to be connected to tree stumps indicated at S at different distances from the hitching skid. The other ends of these cables are suitably connected to a metal ring or loop 19 which is adapted to be sufficiently large to be readily engaged over the obliquely inclined horn 10 and fit around the same at the base thereof, said ring resting upon the tapering end of the body plate 8 of the skid.

In the use of my invention, assuming that the main pulling cable 7 is 50 feet in length, the cables 18 will be say, 20, 30 and 40 feet in length, respectively. The 20 foot cable is connected to one of the tree stumps and is taut between the stump and the hitching skid. The 30 foot cable is slack, and the 40 foot cable contains even more slack after being attached to the tree stump. The end of the main cable 7 is passed upwardly through the opening 11 in the skid and around the reinforcing bars 15, said cable being provided with a suitable tying device on its end to retain the same in connection with the skid. Thus, it will be apparent that when the stump puller is operated, upon rotation of the drum 5, the pulling strain will immediately devolve upon the 20 foot cable and the stump to which it is connected so that this stump will be partially pulled from the ground, the top roots being broken so that the principal resistance to the pull of the chain is destroyed. In the rotation of the drum 5, the slack in the 30 foot cable has been taken up and the stump to which this cable is connected is next pulled. In the meantime, the operator will secure the end of the 20 foot cable to another stump. The slack is, of course, taken up in the 40 foot cable as the hitching skid is drawn over the ground and the stump to which said cable is connected is finally pulled. At this time, the hitching or connecting skid will have been drawn close to the drum 5 of the stump puller, and after the 30 and 40 foot cables have been again attached to other stumps, the stump puller is moved to a new position so that the cable 7 is unwound from the drum. The drum is then again rotated to pull the second series of stumps in the manner above explained. The winding drum is preferably of such diameter that for each 10 feet of the cable 7, at least three tree stumps can be pulled so that an area of approximately 160 feet in diameter can be cleared of stumps before it becomes necessary to move the stump puller.

In the above manner, it will be appreciated that a large number of stumps may be expeditiously pulled or extracted and the field quickly cleared. In the ordinary stump puller, considerable time is lost in attaching pulling cables to the stumps, but by means of my invention, I have eliminated such delays by the provision of the plurality of cables of different lengths. It is manifest that a greater number of such cables may be employed, if desired, and the main pulling cable 7 increased in length accordingly.

I have illustrated and described a connecting or hitching skid which I have found to be very serviceable in actual use, as it is capable of withstanding the severe strains to which such a device must necessarily be subjected. It is, however, to be borne in mind that the size and proportions of the several structural features of the skid will be increased when the stumps to be extracted or pulled are of large size and firmly rooted. In pulling small tree stumps, one of the cables 18 may be connected to several of the stumps.

While my invention, as a whole, is exceedingly simple, it will, nevertheless, be seen that the same may be readily arranged in operative position and connected to the tree stump and to the stump puller, and will serviceably perform the purpose for which the same is devised.

In the practical development of my invention, it may be found desirable to resort to various modifications therein and I, therefore, reserve the privilege of adopting all such mechanical alterations as will fairly fall within the spirit and scope of the invention as claimed.

Having thus fully described my invention, what I desire to claim and secure by Letters Patent is:—

1. A cable connecting skid for stump pullers consisting of a body plate provided upon one end with an obliquely inclined horn, said body plate having longitudinal runners, and reinforcing means secured upon the other end of said plate to which a pulling cable is adapted to be attached.

2. A cable connecting skid for stump pullers consisting of a body plate provided upon one end with an integral obliquely inclined horn to which the end of a cable is adapted to be detachably connected, said body plate having longitudinally extending runners integrally formed upon opposite sides thereof, and reinforcing means secured to the opposite sides of the body plate at its other end to which one end of a power cable is adapted to be attached.

3. A cable connecting skid for stump pullers consisting of a body plate having a central opening and an obliquely inclined tapering horn integrally formed upon one of its ends to which one end of a stump attaching cable is adapted to be detachably connected, said body plate being provided upon its opposite face and at each side of the opening therein with an integral longitudinal runner, and transversely disposed bars detachably secured to the opposite faces of the body plate at its other end to which one end of a power cable is adapted to be attached.

In testimony whereof I hereunto affix my signature in the presence of two witnesses.

JAMES M. McCARGO.

Witnesses:
A. B. HAMNER,
J. T. THOMPSON.